US011858611B2

(12) United States Patent
Dong et al.

(10) Patent No.: US 11,858,611 B2
(45) Date of Patent: *Jan. 2, 2024

(54) MULTI-ROTOR VEHICLE WITH EDGE COMPUTING SYSTEMS

(71) Applicant: THE BOEING COMPANY, Chicago, IL (US)

(72) Inventors: John Jian Dong, Bothell, WA (US); Michael James Duffy, Lansing, NY (US); Douglas C. Cameron, Ladera Ranch, CA (US); Naveed Moayyed Hussain, Palos Verdes Peninsula, CA (US)

(73) Assignee: The Boeing Company, Chicago, IL (US)

(*) Notice: Subject to any disclaimer, the term of this patent is extended or adjusted under 35 U.S.C. 154(b) by 727 days.

This patent is subject to a terminal disclaimer.

(21) Appl. No.: 16/388,374

(22) Filed: Apr. 18, 2019

(65) Prior Publication Data

US 2020/0283126 A1 Sep. 10, 2020

Related U.S. Application Data

(60) Provisional application No. 62/814,349, filed on Mar. 6, 2019.

(51) Int. Cl.
*B64C 13/24* (2006.01)
*G05D 1/08* (2006.01)
(Continued)

(52) U.S. Cl.
CPC ............. *B64C 13/24* (2013.01); *B64C 27/32* (2013.01); *B64C 39/024* (2013.01);
(Continued)

(58) Field of Classification Search
CPC ....... B64C 13/24; B64C 27/32; B64C 39/024; B64C 2201/14; B64C 2201/108;
(Continued)

(56) References Cited

U.S. PATENT DOCUMENTS

2010/0268908 A1 10/2010 Watanabe
2010/0268980 A1* 10/2010 Watanabe ......... H04L 12/40136
714/48
(Continued)

FOREIGN PATENT DOCUMENTS

CN 103856120 A 6/2014
JP 201811434 A 1/2018
(Continued)

OTHER PUBLICATIONS

European Search Report from the corresponding European Application No. 20161153, dated Jul. 24, 2020.

*Primary Examiner* — Faris S Almatrahi
*Assistant Examiner* — Abdalla A Khaled
(74) *Attorney, Agent, or Firm* — Quinn IP Law

(57) ABSTRACT

A multi-rotor vehicle includes a plurality of electric motors and edge computing systems (ECSs). The electric motors are operatively coupled to respective rotors, and cause the respective rotors to rotate relative to the airframe. The ECSs are independent, distinct and distributed to the electric motors, each operatively coupled to a respective electric motor and thereby a respective rotor. Each ECS is configured to acquire and process sensor data for the respective rotor to determine rotor status information, and execute motor commands to control the respective electric motor and thereby the respective rotor. Each ECS is configured as an integrated flight computer and motor controller.

30 Claims, 5 Drawing Sheets

(51) Int. Cl.
*B64C 27/32* (2006.01)
*B64C 39/02* (2023.01)
*B64U 30/20* (2023.01)

(52) U.S. Cl.
CPC ........... *G05D 1/0808* (2013.01); *B64U 30/20* (2023.01); *B64U 2201/00* (2023.01)

(58) Field of Classification Search
CPC ........ B64C 2201/042; B64C 2201/027; G05D 1/0808; G05D 1/0858
See application file for complete search history.

(56) References Cited

U.S. PATENT DOCUMENTS

| | | | |
|---|---|---|---|
| 2016/0107751 A1* | 4/2016 | D'Andrea | B64C 39/024 701/4 |
| 2017/0045892 A1 | 2/2017 | Wang et al. | |
| 2017/0225795 A1* | 8/2017 | Lin | B64C 39/024 |
| 2017/0373621 A1* | 12/2017 | Kessler | H02P 6/30 |
| 2019/0207543 A1* | 7/2019 | Lan | B64D 27/24 |
| 2019/0212733 A1* | 7/2019 | Lan | H02P 27/08 |
| 2020/0207469 A1* | 7/2020 | Benedict | B64C 27/20 |
| 2020/0324894 A1* | 10/2020 | Fredericks | B64D 27/02 |

FOREIGN PATENT DOCUMENTS

| | | |
|---|---|---|
| JP | 2018516200 A | 6/2018 |
| WO | 2018/053680 A1 | 3/2018 |
| WO | 2018/119767 A1 | 7/2018 |

\* cited by examiner

MULTI-ROTOR VEHICLE WITH EDGE COMPUTING SYSTEMS

CROSS-REFERENCE TO RELATED APPLICATION(S)

The present application claims priority to U.S. Provisional Patent Application No. 62/814,349, entitled: Multi-Rotor Vehicle with Edge Computing Systems, filed on Mar. 6, 2019, the content of which is incorporated herein by reference in its entirety.

TECHNOLOGICAL FIELD

The present disclosure relates generally to vehicles and, in particular, to multi-rotor vehicles.

BACKGROUND

A multi-rotor vehicle is generally a vehicle with more than one rotor, typically more than two rotors. A primary example of a multi-rotor vehicle is a non-fixed wing aircraft, referred to as a rotorcraft or rotary-wing aircraft. This multi-rotor vehicle is an aircraft that uses lift generated by wings or propellers, referred to as rotary wings, rotor blades or more simply rotors, that revolve around a mast. A rotorcraft may include one or multiple rotors mounted on a single mast or multiple masts. For example, a quadcopter is a multi-rotor rotorcraft that generates lift via four rotors. Other examples include a tricopter, hexacopter and octocopter that include respectively three, six and eight rotors. A rotorcraft may be an unmanned rotorcraft controlled via a remote communications station and/or programmed instructions, although in other examples, a rotorcraft may be a manned vehicle.

Multi-rotor rotorcraft typically include a centrally-located flight controller, which makes it a single point of failure. Most flight control computers and sensors are triple redundant to improve flight worthiness; however, this requires control forces (control rods), actuator communication and sensor communication must be routed from the central flight controller to each actuator on the rotorcraft. This equates to added weight and complexity.

Therefore it would be desirable to have a system and method that takes into account at least some of the issues discussed above, as well as other possible issues.

BRIEF SUMMARY

Example implementations of the present disclosure are directed to a multi-rotor vehicle with distributed modular-based edge computing systems that may be embedded with an integrated flight and motor control system for each rotor. The edge computing systems may also include one or more communication interfaces for communication with others of the edge computing systems, and/or remote stations. The modular-based edge computing systems of example implementations may increase the reliability and survivability of the multi-rotor vehicle.

The present disclosure thus includes, without limitation, the following example implementations.

Some example implementations provide a multi-rotor vehicle comprising: an airframe; and coupled to the airframe, a plurality of electric motors operatively coupled to a respective plurality of rotors, the plurality of electric motors configured to cause the respective plurality of rotors to rotate relative to the airframe; and a plurality of edge computing systems that are independent, distinct and distributed to the plurality of electric motors, each edge computing system of the plurality of edge computing systems operatively coupled to a respective electric motor of the plurality of electric motors, and thereby a respective rotor of the respective plurality of rotors, each edge computing system configured to acquire and process sensor data for the respective rotor to determine rotor status information, and execute motor commands to control the respective electric motor and thereby the respective rotor, wherein each edge computing system is configured as an integrated flight computer and motor controller.

In some example implementations of the multi-rotor vehicle of any preceding example implementation, or any combination of any preceding example implementations, each edge computing system includes first power distribution circuitry for the flight computer, and second power distribution circuitry for the motor controller.

In some example implementations of the multi-rotor vehicle of any preceding example implementation, or any combination of any preceding example implementations, each edge computing system further includes a power inverter circuit coupled to the second power distribution circuitry, the power inverter circuit configured to supply power to the respective electric motor of the edge computing system.

In some example implementations of the multi-rotor vehicle of any preceding example implementation, or any combination of any preceding example implementations, each edge computing system includes: processing circuitry configured to acquire and process the sensor data for the respective rotor to determine rotor status information, and execute the motor commands to control the respective electric motor and thereby the respective rotor; and a communication interface configured to enable the edge computing system to communicate with others of the plurality of edge computing systems.

In some example implementations of the multi-rotor vehicle of any preceding example implementation, or any combination of any preceding example implementations, the plurality of edge computing systems are configured according to a model in which any of the plurality of edge computing systems is selectable as a primary edge computing system, and the plurality of edge computing systems other than the primary edge computing system are operable as secondary edge computing systems, the secondary edge computing systems configured to communicate respective rotor status information to the primary edge computing system, and the primary edge computing system configured to provide the motor commands to the secondary edge computing systems.

In some example implementations of the multi-rotor vehicle of any preceding example implementation, or any combination of any preceding example implementations, each edge computing system further includes a second communication interface configured to enable the edge computing system to communicate with a remote station, the primary edge computing system among the plurality of edge computing systems being configured to communicate with the remote station.

In some example implementations of the multi-rotor vehicle of any preceding example implementation, or any combination of any preceding example implementations, the processing circuitry of each edge computing system further includes a clock to measure and keep time at the edge computing system, the secondary edge computing systems configured to communicate with the primary edge computing system via respective communication interfaces to synchronize respective clocks of the secondary edge computing systems with the clock of the primary edge computing system.

In some example implementations of the multi-rotor vehicle of any preceding example implementation, or any combination of any preceding example implementations, the primary edge computing system is configured to implement the flight computer to determine attitude, position and heading of the multi-rotor vehicle, and provide the motor commands based on the rotor status information for the respective plurality of rotors, and the attitude, position and heading.

In some example implementations of the multi-rotor vehicle of any preceding example implementation, or any combination of any preceding example implementations, each edge computing system includes an inertial measurement unit (IMU) and magnetometer, and the IMU and magnetometer of the primary edge computing system are configured to determine the attitude, position and heading of the multi-rotor vehicle.

In some example implementations of the multi-rotor vehicle of any preceding example implementation, or any combination of any preceding example implementations, each edge computing system is configured to store a configuration file with an ordered list of the plurality of edge computing systems that begins with the primary edge computing system and then a first of the secondary edge computing systems, and wherein the primary edge computing system is configured to communicate health status information to the first of the secondary edge computing systems, and in response, the first of the secondary edge computing systems is configured to determine a health status of the primary edge computing system from the health status information, and assume responsibility as the primary edge computing system when the health status reaches a predetermined threshold.

In some example implementations of the multi-rotor vehicle of any preceding example implementation, or any combination of any preceding example implementations, the ordered list includes a second of the secondary edge computing systems after the first of the secondary edge computing systems, and wherein after the first of the secondary edge computing systems assumes responsibility as the primary edge computing system, the second of the secondary edge computing systems assumes responsibility as the first of the secondary edge computing systems.

Some example implementations provide an edge computing system of a plurality of edge computing systems configured for use on a multi-rotor vehicle including a plurality of electric motors operatively coupled to a respective plurality of rotors, the plurality of electric motors configured to cause the respective plurality of rotors to rotate relative to an airframe, the plurality of edge computing systems being independent, distinct and distributable to the plurality of electric motors, the edge computing system comprising: processing circuitry operatively coupleable to a respective electric motor of the plurality of electric motors, and thereby a respective rotor of the respective plurality of rotors, the processing circuitry configured to acquire and process sensor data for the respective rotor to determine rotor status information, and execute motor commands to control the respective electric motor and thereby the respective rotor; and a communication interface configured to enable the edge computing system to communicate with others of the plurality of edge computing systems, wherein the edge computing system is configured as an integrated flight computer and motor controller.

In some example implementations of the edge computing system of any preceding example implementation, or any combination of any preceding example implementations, the edge computing system further comprises first power distribution circuitry for the flight computer, and second power distribution circuitry for the motor controller.

In some example implementations of the edge computing system of any preceding example implementation, or any combination of any preceding example implementations, the edge computing system further comprises a power inverter circuit coupled to the second power distribution circuitry, the power inverter circuit configured to supply power to the respective electric motor of the edge computing system.

In some example implementations of the edge computing system of any preceding example implementation, or any combination of any preceding example implementations, the edge computing system is configured to communicate with the others of the plurality of edge computing systems according to a model in which any of the plurality of edge computing systems is selectable as a primary edge computing system, and the plurality of edge computing systems other than the primary edge computing system are operable as secondary edge computing systems, the secondary edge computing systems configured to communicate respective rotor status information to the primary edge computing system, and the primary edge computing system configured to provide the motor commands to the secondary edge computing systems.

In some example implementations of the edge computing system of any preceding example implementation, or any combination of any preceding example implementations, the edge computing system further comprises a second communication interface configured to enable the edge computing system to communicate with a remote station, the primary edge computing system among the plurality of edge computing systems being configured to communicate with the remote station.

In some example implementations of the edge computing system of any preceding example implementation, or any combination of any preceding example implementations, the processing circuitry of the edge computing system further includes a clock to measure and keep time at the edge computing system, the secondary edge computing systems configured to communicate with the primary edge computing system via respective communication interfaces to synchronize respective clocks of the secondary edge computing systems with the clock of the primary edge computing system.

In some example implementations of the edge computing system of any preceding example implementation, or any combination of any preceding example implementations, the primary edge computing system is configured to implement the flight computer to determine attitude, position and heading of the multi-rotor vehicle, and provide the motor commands based on the rotor status information for the respective plurality of rotors, and the attitude, position and heading.

In some example implementations of the edge computing system of any preceding example implementation, or any combination of any preceding example implementations, the edge computing system further comprises an inertial measurement unit (IMU) and magnetometer, and the IMU and magnetometer of the primary edge computing system are configured to determine the attitude, position and heading of the multi-rotor vehicle.

In some example implementations of the edge computing system of any preceding example implementation, or any combination of any preceding example implementations, the edge computing system is configured to store a configuration file with an ordered list of the plurality of edge computing systems that begins with the primary edge computing system and then a first of the secondary edge computing systems, and wherein the primary edge computing system is configured to communicate health status information to the first of the secondary edge computing systems, and in response, the first of the secondary edge computing systems is configured to determine a health status of the primary edge computing system from the health status information, and assume responsibility as the primary edge computing system when the health status reaches a predetermined threshold.

In some example implementations of the edge computing system of any preceding example implementation, or any combination of any preceding example implementations, the ordered list includes a second of the secondary edge computing systems after the first of the secondary edge computing systems, and wherein after the first of the secondary edge computing systems assumes responsibility as the primary edge computing system, the second of the secondary edge computing systems assumes responsibility as the first of the secondary edge computing systems.

Some example implementations provide a method of operating a multi-rotor vehicle including a plurality of electric motors operatively coupled to a respective plurality of rotors, and a plurality of edge computing systems that are independent, distinct and distributed to the plurality of electric motors, each edge computing system of the plurality of edge computing systems operatively coupled to a respective electric motor of the plurality of electric motors, and thereby a respective rotor of the respective plurality of rotors, the method comprising each edge computing system: acquiring and processing sensor data for the respective rotor to determine rotor status information; and executing motor commands to control the respective electric motor and thereby the respective rotor, wherein each edge computing system is configured as an integrated flight computer and motor controller.

In some example implementations of the method of any preceding example implementation, or any combination of any preceding example implementations, each edge computing system includes first power distribution circuitry for the flight computer, second power distribution circuitry for the motor controller, and a power inverter circuit coupled to the second power distribution circuitry, and the method further comprises the power inverter circuit supplying power to the respective electric motor of the edge computing system.

In some example implementations of the method of any preceding example implementation, or any combination of any preceding example implementations, the plurality of edge computing systems are configured according to a model in which any of the plurality of edge computing systems is selectable as a primary edge computing system, and the plurality of edge computing systems other than the primary edge computing system are operable as secondary edge computing systems, the method further comprising the secondary edge computing systems communicating respective rotor status information to the primary edge computing system, and the primary edge computing system providing the motor commands to the secondary edge computing systems.

In some example implementations of the method of any preceding example implementation, or any combination of any preceding example implementations, each edge computing system is enabled to communicate with a remote station, and the method further comprises the primary edge computing system among the plurality of edge computing systems communicating with the remote station.

In some example implementations of the method of any preceding example implementation, or any combination of any preceding example implementations, each edge computing system includes a clock to measure and keep time at the edge computing system, and the method further comprises the secondary edge computing systems communicating with the primary edge computing system to synchronize respective clocks of the secondary edge computing systems with the clock of the primary edge computing system.

In some example implementations of the method of any preceding example implementation, or any combination of any preceding example implementations, the method further comprises the primary edge computing system implementing the flight computer to determine attitude, position and heading of the multi-rotor vehicle, and providing the motor commands based on the rotor status information for the respective plurality of rotors, and the attitude, position and heading.

In some example implementations of the method of any preceding example implementation, or any combination of any preceding example implementations, each edge computing system includes an inertial measurement unit (IMU) and magnetometer, and the method further comprises the IMU and magnetometer of the primary edge computing system determining the attitude, position and heading of the multi-rotor vehicle.

In some example implementations of the method of any preceding example implementation, or any combination of any preceding example implementations, each edge computing system is configured to store a configuration file with an ordered list of the plurality of edge computing systems that begins with the primary edge computing system and then a first of the secondary edge computing systems, and wherein the method further comprises the primary edge computing system communicating health status information to the first of the secondary edge computing systems, and in response, the first of the secondary edge computing systems determining a health status of the primary edge computing system from the health status information, and assuming responsibility as the primary edge computing system when the health status reaches a predetermined threshold.

In some example implementations of the method of any preceding example implementation, or any combination of any preceding example implementations, the ordered list includes a second of the secondary edge computing systems after the first of the secondary edge computing systems, and wherein the method further comprises, after the first of the secondary edge computing systems assumes responsibility as the primary edge computing system, the second of the secondary edge computing systems assuming responsibility as the first of the secondary edge computing systems.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 3:
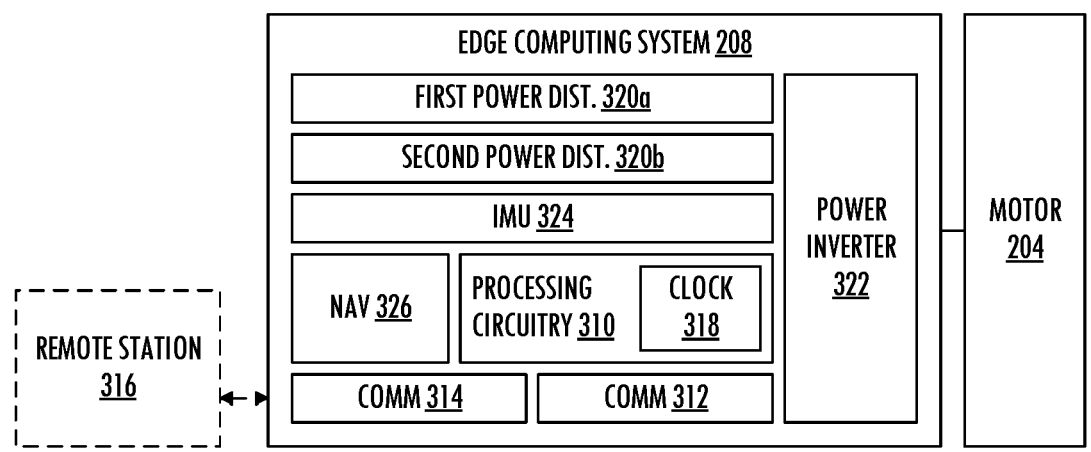
Figure 4:
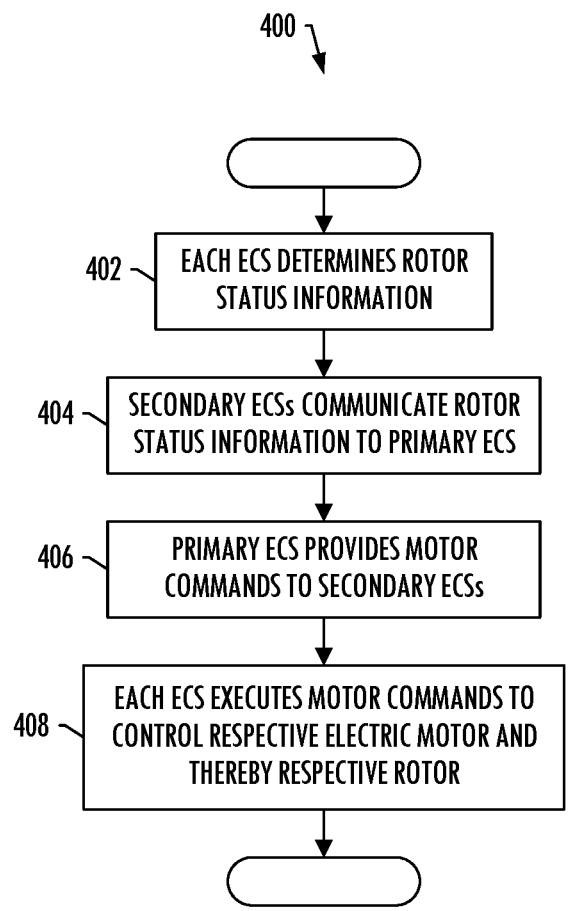
Figure 5:
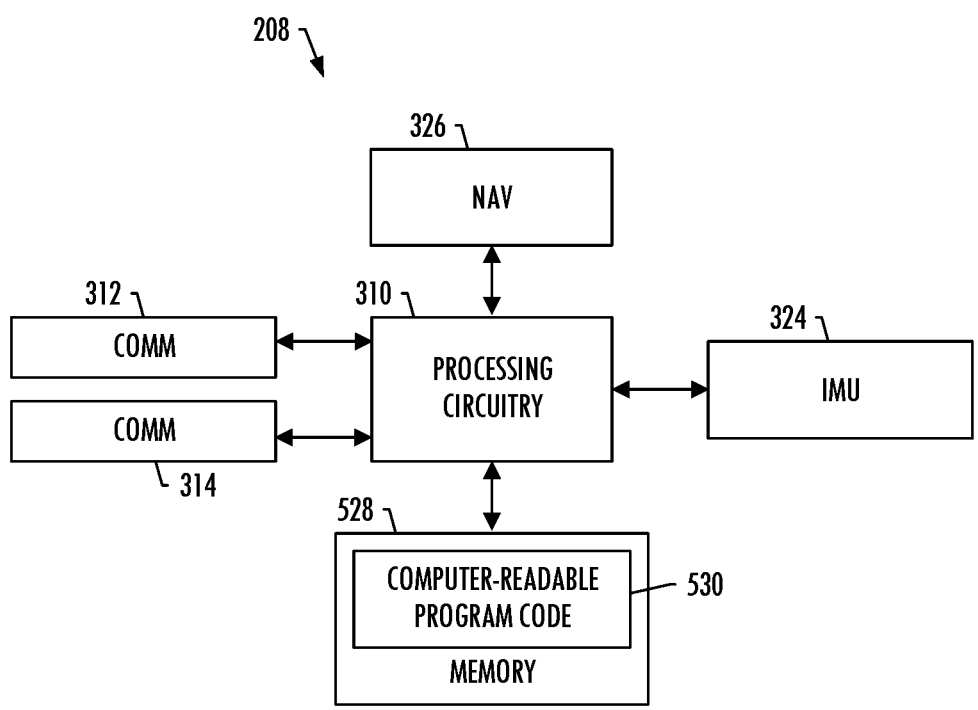

FIG. 3 more particularly illustrates an edge computing system, according to example implementations;

FIG. 4 is a flowchart illustrating various steps in a method of operating a multi-rotor vehicle, according to example implementations; and FIG. 5 illustrates an edge computing system including processing circuitry and various components of the edge computing system coupled thereto, according to example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Figure 1:
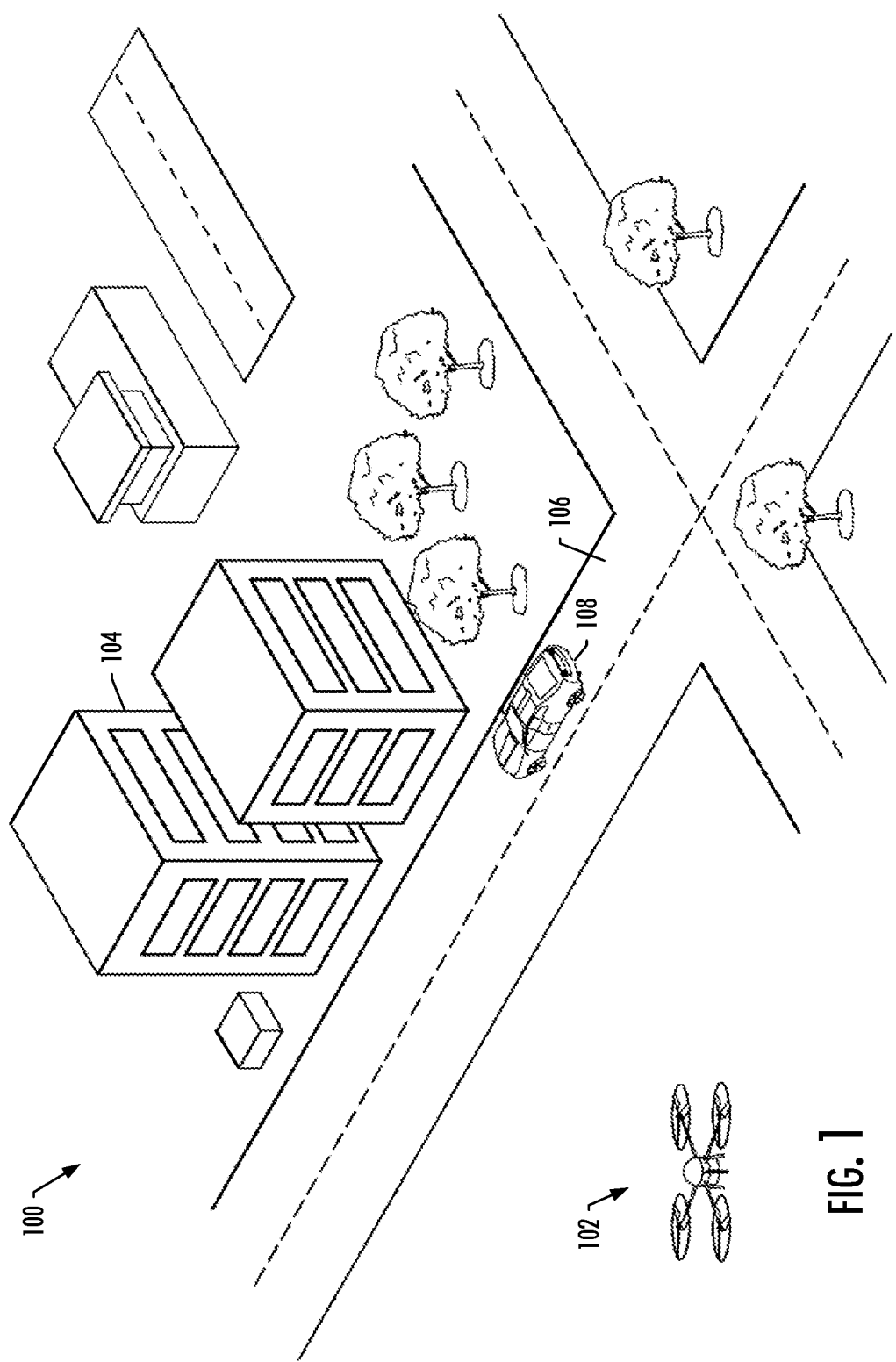
FIG. 1 illustrates a multi-rotor vehicle environment in accordance with example implementations of the present disclosure.

FIG. 1 illustrates a multi-rotor vehicle environment 100 in accordance with example implementations of the present disclosure. The multi-rotor vehicle environment is an example of an environment in which a multi-rotor vehicle 102 may operate. The multi-rotor vehicle is generally a vehicle such as a rotorcraft with more than one rotor, typically more than two rotors. These rotors are sometimes referred to as wings, propellers, rotary wings, rotor blades or the like, and each revolves around a mast coupled to a motor. As shown, the multi-rotor vehicle takes the form of a quadcopter, which may be manned or unmanned. Other examples of suitable multi-rotor vehicles include a manned or unmanned tricopter, hexacopter, octocopter or the like.

The multi-rotor vehicle 102 flies and may perform additional operations in the multi-rotor vehicle environment 100. For example, the multi-rotor vehicle may perform operations for a surveillance mission. The operations for the surveillance mission may include generating images of objects including a building 104. These images may be still images, video, or some combination thereof. Additionally, the surveillance mission also may include generating images of traffic on road 106. For example, the multi-rotor vehicle may generate images of a vehicle 108 moving on the road.

Figure 2:
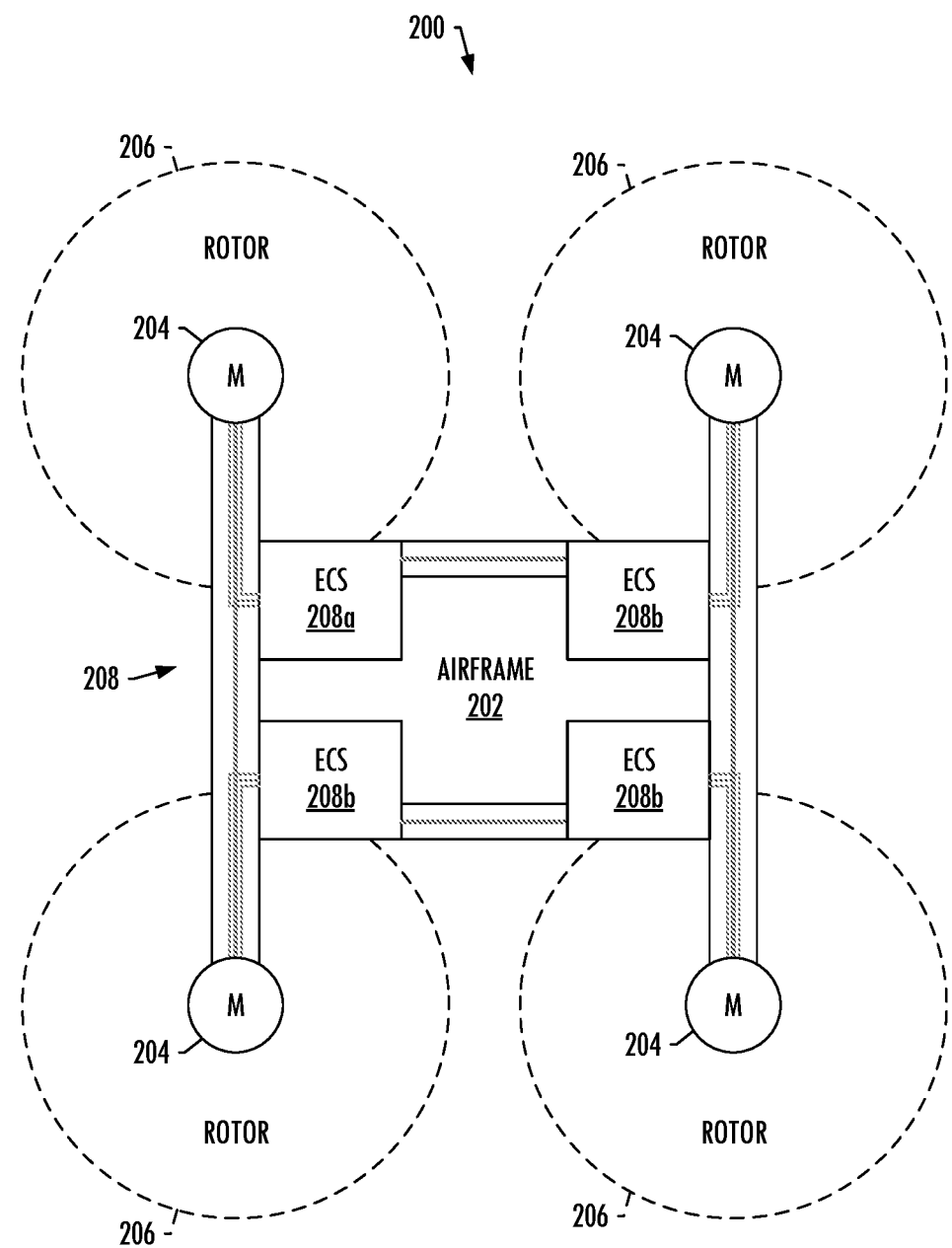
FIG. 2 illustrates a multi-rotor vehicle according to some example implementations.

According to example implementations of the present disclosure, the multi-rotor vehicle 102 includes distributed modular-based edge computing systems that may increase the reliability and survivability of the multi-rotor vehicle. FIG. 2 illustrates a multi-rotor vehicle 200 that may correspond to multi-rotor vehicle 102, according to some example implementations of the present disclosure. As shown, the multi-rotor vehicle includes an airframe 202, and coupled to the airframe, a plurality of electric motors 204 operatively coupled to a respective plurality of rotors 206. The plurality of electric motors are configured to cause the respective plurality of rotors to rotate relative to the airframe.

Also coupled to the airframe 202, the multi-rotor vehicle 200 includes a plurality of edge computing systems (ECS) 208 (shown operable as including primary and secondary edge computing systems 208a, 208b) that are independent, distinct and distributed to the plurality of electric motors (M) 204. Each edge computing system of the plurality of edge computing systems is operatively coupled to a respective electric motor of the plurality of electric motors, and thereby a respective rotor of the respective plurality of rotors 206. Each edge computing system is configured to acquire and process sensor data for the respective rotor to determine rotor status information, and execute motor commands to control the respective electric motor and thereby the respective rotor. Examples of suitable sensor data include rotor status information such as rotation direction, rotation speed, blade angle, altitude, wind and the like.

In some examples, the plurality of edge computing systems 208 are configured according to a model in which any of the plurality of edge computing systems is selectable as a primary edge computing system 208a, and the plurality of edge computing systems other than the primary edge computing system are operable as secondary edge computing systems 208b. The secondary edge computing systems are configured to communicate respective rotor status information to the primary edge computing system, and the primary edge computing system is configured to provide the motor commands to the secondary edge computing systems.

In some examples, each edge computing system 208 is configured to store a configuration file with an ordered list of the plurality of edge computing systems that begins with the primary edge computing system 208a and then a first of the secondary edge computing systems 208b. In these examples, the primary edge computing system is configured to communicate health status information to the first of the secondary edge computing systems. In response, the first of the secondary edge computing systems is configured to determine a health status of the primary edge computing system from the health status information, and assume responsibility as the primary edge computing system when the health status reaches a predetermined threshold.

In some further examples, the ordered list includes a second of the secondary edge computing systems 208b after the first of the secondary edge computing systems. In these examples, after the first of the secondary edge computing systems assumes responsibility as the primary edge computing system 208a, the second of the secondary edge computing systems assumes responsibility as the first of the secondary edge computing systems.

FIG. 3 more particularly illustrates an edge computing system 208, according to example implementations of the present disclosure. As shown, the edge computing system includes processing circuitry 310 and a communication interface 312. The processing circuitry is configured to acquire and process the sensor data for the respective rotor of the plurality of rotors 206 to determine rotor status information, and execute the motor commands to control the respective electric motor 204 and thereby the respective rotor. And the communication interface is configured to enable the edge computing system to communicate with others of the plurality of edge computing systems.

In some examples, the edge computing system 208 further includes a second communication interface 314 configured to enable the edge computing system to communicate with a remote station 316. In these examples, the primary edge computing system 208a among the plurality of edge computing systems is configured to communicate with the remote station. Examples of suitable remote stations include fixe or mobile ground stations or terminals, other vehicles such as other aircraft, rotorcraft or the like.

In some examples, the processing circuitry 310 further includes a clock 318 to measure and keep time at the edge computing system. In these examples, the secondary edge computing systems is configured to communicate with the primary edge computing system 208a via respective communication interfaces to synchronize respective clocks of the secondary edge computing systems with the clock of the primary edge computing system.

In some examples, each edge computing system 208 is configured as an integrated flight computer and motor controller. To this end, the edge computing system may include first power distribution circuitry 320a such as low-voltage power distribution circuitry for the flight computer, and second power distribution circuitry 320b such as high-voltage power distribution circuitry for the motor controller. In some further examples, the edge computing system includes a power inverter circuit 322 coupled to the second power distribution circuitry, the power inverter circuit configured to supply power to the respective electric motor 204 of the edge computing system.

In some examples, the primary edge computing system 208a is configured to implement the flight computer to determine attitude, position and heading of the multi-rotor vehicle 200, and provide the motor commands based on the rotor status information for the respective plurality of rotors 206, and the attitude, position and heading. In some of these examples, each edge computing system 208 includes an inertial measurement unit (IMU) 324 and one or more navigation sensors 326 such as a magnetometer. The IMU and magnetometer of the primary edge computing system are configured to determine the attitude, position and heading of the multi-rotor vehicle. In these examples, the IMU of the edge computing system is co-located with the respective rotor of the plurality of rotors 206. This may enable high bandwidth phase stabilization of local dynamic motor elastic modes without the need for high bandwidth sharing across multiple flight computers (no need to share high frequency data with other flight computers).

FIG. 4 is a flowchart illustrating various steps in a method 400 of operating a multi-rotor vehicle 200, according to example implementations of the present disclosure. As shown at 402 and 408, the method includes each edge computing system 208 acquiring and processing sensor data for the respective rotor of the plurality of rotors 206 to determine rotor status information, and executing motor commands to control the respective electric motor 204 and thereby the respective rotor. Again, the plurality of edge computing systems are configured according to a model in which any of the plurality of edge computing systems is selectable as a primary edge computing system 208a, and the plurality of edge computing systems other than the primary edge computing system are operable as secondary edge computing systems 208b. The method further includes the secondary edge computing systems communicating respective rotor status information to the primary edge computing system, and the primary edge computing system providing the motor commands to the secondary edge computing systems, as shown at 404 and 406.

According to example implementations of the present disclosure, the edge computing system 208 and its components may be implemented by various means. Means for implementing the edge computing system and its components may include hardware, alone or under direction of one or more computer programs from a computer-readable storage medium. FIG. 5 illustrates the edge computing system including its processing circuitry 310 and various components of the edge computing system coupled to the processing circuitry for carrying out functions of the edge computing system such as those described herein. As shown, the edge computing system may include one or more of each of a number of components such as, for example, the processing circuitry 310 connected to a memory 528 (e.g., storage device).

The processing circuitry 310 may include one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 528 (of the same or another apparatus).

The processing circuitry 310 may be a number of processors, a multi-core processor or some other type of processor, depending on the particular implementation. The processing circuitry may include a graphic processing unit (GPU), a central processing unit (CPU), or a combination of GPU and CPU. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 528 is generally any piece of computer hardware that is capable of storing information such as, for example, data, computer programs (e.g., computer-readable program code 530) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 528, as descried above, the processing circuitry 310 may also be connected to one or more interfaces for displaying, transmitting and/or receiving information. The interfaces may include the communications interface 312, and perhaps also the second communication interface 314. The communications interface(s) may be configured to transmit and/or receive information, such as to and/or from other edge computing systems 208, remote stations 316 or the like. The communications interface(s) may be configured to transmit and/or receive information by physical (wired) and/or wireless communications links. These physical (wired) communication links in particular may be configured to implement any of a number of different technologies such as RS-485, controller area network (CAN) bus or the like. Likewise, wireless communication links in particular may be configured to implement any of a number of different radio access technologies such as any of a number of 3GPP or 4GPP radio access technologies, UMTS UTRA, GSM radio access technologies, CDMA 2000 radio access technologies, WLANs (e.g., IEEE 802.xx, e.g., 802.11a, 802.11b, 802.11g, 802.11n), WiMAX, IEEE 802.16, wireless PANs (WPANs) (e.g., IEEE 802.15, Bluetooth®, low power versions of Bluetooth®, IrDA, UWB, Wibree, Zigbee®), near-field communication technologies, and the like.

The processing circuitry 310 may also be connected to an IMU 324 and one or more navigation sensors 326. The IMU may include one or more sensors such as accelerometers and gyroscopes, and may also include magnetometers. As indicated above, the navigation sensor(s) may likewise include a magnetometer. Other examples of suitable navigation sensors include a barometer, satellite-based navigation receiver (e.g., GPS, GLONASS) and the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an edge computing system 208 may include processing circuitry 310 and a computer-readable storage medium or memory 528 coupled to the processing circuitry, where the processing circuitry is configured to execute computer-readable program code 530 stored in the memory. It will also be understood that one or more functions, and combinations of functions, may be implemented by special purpose hardware-based apparatuses and/or processing circuitry s which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A multi-rotor vehicle comprising: an airframe; and coupled to the airframe,
   a plurality of electric motors operatively coupled to a respective plurality of rotors, the plurality of electric motors configured to cause the respective plurality of rotors to rotate relative to the airframe; and
   a plurality of edge computing systems that are independent, distinct and distributed to the plurality of electric motors, each edge computing system of the plurality of edge computing systems operatively coupled to a respective electric motor of the plurality of electric motors, and thereby a respective rotor of the respective plurality of rotors, each edge computing system configured to acquire and process sensor data for the respective rotor to determine rotor status information, and execute motor commands to control the respective electric motor and thereby the respective rotor,
   wherein each edge computing system is configured as an integrated flight computer and motor controller.

2. The multi-rotor vehicle of claim 1, wherein each edge computing system includes first power distribution circuitry for the flight computer, and second power distribution circuitry for the motor controller.

3. The multi-rotor vehicle of claim 2, wherein each edge computing system further includes a power inverter circuit coupled to the second power distribution circuitry, the power inverter circuit configured to supply power to the respective electric motor of the edge computing system.

4. The multi-rotor vehicle of claim 1, wherein each edge computing system includes:
   processing circuitry configured to acquire and process the sensor data for the respective rotor to determine the rotor status information, and execute the motor commands to control the respective electric motor and thereby the respective rotor; and
   a communication interface configured to enable the edge computing system to communicate with others of the plurality of edge computing systems.

5. The multi-rotor vehicle of claim 4, wherein the plurality of edge computing systems are configured according to a model in which any of the plurality of edge computing systems is selectable as a primary edge computing system, and the plurality of edge computing systems other than the primary edge computing system are operable as secondary edge computing systems, the secondary edge computing systems configured to communicate respective rotor status information to the primary edge computing system, and the primary edge computing system configured to provide the motor commands to the secondary edge computing systems.

6. The multi-rotor vehicle of claim 5, wherein each edge computing system further includes a second communication interface configured to enable the edge computing system to communicate with a remote station, the primary edge computing system among the plurality of edge computing systems being configured to communicate with the remote station.

7. The multi-rotor vehicle of claim 5, wherein the processing circuitry of each edge computing system further includes a clock to measure and keep time at the edge computing system, the secondary edge computing systems configured to communicate with the primary edge computing system via respective communication interfaces to synchronize respective clocks of the secondary edge computing systems with the clock of the primary edge computing system.

8. The multi-rotor vehicle of claim 5, wherein the primary edge computing system is configured to implement the flight computer to determine attitude, position and heading of the multi-rotor vehicle, and provide the motor commands based on the rotor status information for the respective plurality of rotors, and the attitude, position and heading.

9. The multi-rotor vehicle of claim 8, wherein each edge computing system includes an inertial measurement unit (IMU) and magnetometer, and the IMU and magnetometer of the primary edge computing system are configured to determine the attitude, position and heading of the multi-rotor vehicle.

10. The multi-rotor vehicle of claim 5, wherein each edge computing system is configured to store a configuration file with an ordered list of the plurality of edge computing systems that begins with the primary edge computing system and then a first of the secondary edge computing systems, and
    wherein the primary edge computing system is configured to communicate health status information to the first of the secondary edge computing systems, and in response, the first of the secondary edge computing systems is configured to determine a health status of the primary edge computing system from the health status information, and assume responsibility as the primary edge computing system when the health status reaches a predetermined threshold.

11. The multi-rotor vehicle of claim 10, wherein the ordered list includes a second of the secondary edge computing systems after the first of the secondary edge computing systems, and
    wherein after the first of the secondary edge computing systems assumes responsibility as the primary edge computing system, the second of the secondary edge computing systems assumes responsibility as the first of the secondary edge computing systems.

12. An edge computing system of a plurality of edge computing systems configured for use on a multi-rotor vehicle including a plurality of electric motors operatively coupled to a respective plurality of rotors, the plurality of electric motors configured to cause the respective plurality of rotors to rotate relative to an airframe, the plurality of edge computing systems being independent, distinct and distributable to the plurality of electric motors, the edge computing system comprising:
    processing circuitry operatively coupleable to a respective electric motor of the plurality of electric motors, and thereby a respective rotor of the respective plurality of rotors, the processing circuitry configured to acquire and process sensor data for the respective rotor to determine rotor status information, and execute motor commands to control the respective electric motor and thereby the respective rotor; and
    a communication interface configured to enable the edge computing system to communicate with others of the plurality of edge computing systems,
    wherein the edge computing system is configured as an integrated flight computer and motor controller.

13. The edge computing system of claim 12, wherein the edge computing system further comprises first power distribution circuitry for the flight computer, and second power distribution circuitry for the motor controller.

14. The edge computing system of claim 13, wherein the edge computing system further comprises a power inverter circuit coupled to the second power distribution circuitry, the power inverter circuit configured to supply power to the respective electric motor of the edge computing system.

15. The edge computing system of claim 12, wherein the edge computing system is configured to communicate with the others of the plurality of edge computing systems according to a model in which any of the plurality of edge computing systems is selectable as a primary edge computing system, and the plurality of edge computing systems other than the primary edge computing system are operable as secondary edge computing systems, the secondary edge computing systems configured to communicate respective rotor status information to the primary edge computing system, and the primary edge computing system configured to provide the motor commands to the secondary edge computing systems.

16. The edge computing system of claim 15, wherein the edge computing system further comprises a second communication interface configured to enable the edge computing system to communicate with a remote station, the primary edge computing system among the plurality of edge computing systems being configured to communicate with the remote station.

17. The edge computing system of claim 15, wherein the processing circuitry of the edge computing system further includes a clock to measure and keep time at the edge computing system, the secondary edge computing systems configured to communicate with the primary edge computing system via respective communication interfaces to synchronize respective clocks of the secondary edge computing systems with the clock of the primary edge computing system.

18. The edge computing system of claim 15, wherein the primary edge computing system is configured to implement the flight computer to determine attitude, position and heading of the multi-rotor vehicle, and provide the motor commands based on the rotor status information for the respective plurality of rotors, and the attitude, position and heading.

19. The edge computing system of claim 18, wherein the edge computing system further comprises an inertial measurement unit (IMU) and magnetometer, and the IMU and magnetometer of the primary edge computing system are configured to determine the attitude, position and heading of the multi-rotor vehicle.

20. The edge computing system of claim 15, wherein the edge computing system is configured to store a configuration file with an ordered list of the plurality of edge computing systems that begins with the primary edge computing system and then a first of the secondary edge computing systems, and wherein the primary edge computing system is configured to communicate health status information to the first of the secondary edge computing systems, and in response, the first of the secondary edge computing systems is configured to determine a health status of the primary edge computing system from the health status information, and assume responsibility as the primary edge computing system when the health status reaches a predetermined threshold.

21. The edge computing system of claim 20, wherein the ordered list includes a second of the secondary edge computing systems after the first of the secondary edge computing systems, and wherein after the first of the secondary edge computing systems assumes responsibility as the primary edge computing system, the second of the secondary edge computing systems assumes responsibility as the first of the secondary edge computing systems.

22. A method of operating a multi-rotor vehicle including a plurality of electric motors operatively coupled to a respective plurality of rotors, and a plurality of edge computing systems that are independent, distinct and distributed to the plurality of electric motors, each edge computing system of the plurality of edge computing systems operatively coupled to a respective electric motor of the plurality of electric motors, and thereby a respective rotor of the respective plurality of rotors, the method comprising each edge computing system:

acquiring and processing sensor data for the respective rotor to determine rotor status information; and executing motor commands to control the respective electric motor and thereby the respective rotor, wherein each edge computing system is configured as an integrated flight computer and motor controller.

23. The method of claim 22, wherein each edge computing system includes first power distribution circuitry for the flight computer, second power distribution circuitry for the motor controller, and a power inverter circuit coupled to the second power distribution circuitry, and the method further comprises the power inverter circuit supplying power to the respective electric motor of the edge computing system.

24. The method of claim 22, wherein the plurality of edge computing systems are configured according to a model in which any of the plurality of edge computing systems is selectable as a primary edge computing system, and the plurality of edge computing systems other than the primary edge computing system are operable as secondary edge computing systems, the method further comprising the secondary edge computing systems communicating respective rotor status information to the primary edge computing system, and the primary edge computing system providing the motor commands to the secondary edge computing systems.

25. The method of claim 24, wherein each edge computing system is enabled to communicate with a remote station, and the method further comprises the primary edge computing system among the plurality of edge computing systems communicating with the remote station.

26. The method of claim 24, wherein each edge computing system includes a clock to measure and keep time at the edge computing system, and the method further comprises the secondary edge computing systems communicating with the primary edge computing system to synchronize respective clocks of the secondary edge computing systems with the clock of the primary edge computing system.

27. The method of claim 24, wherein the method further comprises the primary edge computing system implementing the flight computer to determine attitude, position and heading of the multi-rotor vehicle, and providing the motor commands based on the rotor status information for the respective plurality of rotors, and the attitude, position and heading.

28. The method of claim 27, wherein each edge computing system includes an inertial measurement unit (IMU) and magnetometer, and the method further comprises the IMU and magnetometer of the primary edge computing system determining the attitude, position and heading of the multi-rotor vehicle.

29. The method of claim 24, wherein each edge computing system is configured to store a configuration file with an ordered list of the plurality of edge computing systems that begins with the primary edge computing system and then a first of the secondary edge computing systems, and wherein the method further comprises the primary edge computing system communicating health status information to the first of the secondary edge computing systems, and in response, the first of the secondary edge computing systems determining a health status of the primary edge computing system from the health status information, and assuming responsibility as the primary edge computing system when the health status reaches a predetermined threshold.

30. The method of claim 29, wherein the ordered list includes a second of the secondary edge computing systems after the first of the secondary edge computing systems, and wherein the method further comprises, after the first of the secondary edge computing systems assumes responsibility as the primary edge computing system, the second of the secondary edge computing systems assuming responsibility as the first of the secondary edge computing systems.

* * * * *